United States Patent [19]

Nakayama

[11] Patent Number: 4,859,112
[45] Date of Patent: Aug. 22, 1989

[54] DEVICE FOR JOINING FRAME MEMBERS FOR PICTURE FRAME

[76] Inventor: Toshiaki Nakayama, No. 2-13, 1-chome, Komagata, Taito-ku, Tokyo, Japan

[21] Appl. No.: 163,581
[22] Filed: Mar. 3, 1988
[51] Int. Cl.[4] .............................. A47G 1/06; F16B 2/00
[52] U.S. Cl. .................................... 403/402; 403/205; 40/152; 40/155
[58] Field of Search .............. 403/401, 402, 403, 205, 403/295; 40/152, 155

[56] References Cited

U.S. PATENT DOCUMENTS 3,456,973  7/1969  Peter .................................... 403/402
4,531,315  7/1985  Sobel .................................... 403/401

Primary Examiner—Andrew V. Kundrat
Assistant Examiner—Carol I. Bordan
Attorney, Agent, or Firm—Fleit-Jacobson, Cohn, Price, Holman & Stern

[57] ABSTRACT

The present device is for joining frame members for a picture frame, in which a handle and engaging walls are formed integral with a base plate. Elongated grooves are cut through the base plate in parallel with the engaging walls, respectively, so that the elasticity of the base plate is further enhanced. Push-down grips are extended from the base plate in parallel with the elongated grooves, respectively, whereby the bending of the base plate is facilitated and therefore the disengagement of the stoppers is effectively accomplished, enabling easy removal of a first frame member.

1 Claim, 2 Drawing Sheets

DEVICE FOR JOINING FRAME MEMBERS FOR PICTURE FRAME

BACKGROUND OF THE INVENTION

The present invention relates to a joint device with a joint fixture for assembling a picture frame in which adjacent frames mainly made of a light metal or synthetic resin are joined by the joint fixture and belongs to International Class A47G1/00.

In the cases of the conventional picture frames, as shown in FIG. 6, when a metal fixture 1 which join frame members 10a and 10c is removed, a projection 5 is pushed downward so that stoppers 7 are disengaged from notches 12, respectively, of frame members 10a and 10c and then the frame member 10a is displaced in the longitudinal direction of the adjacent frame member 10c or the frame member 10c is displaced in the longitudinal direction of the frame 10a. However, it is not easy to disengage the stopper 7 from the notches 12 only by pushing down the projection 5.

As described above, the projection 5 is pushed downward so as to disengage the stoppers 7 from the notches 12, but even when a base plate is made of an elastic plastic, a considerably strong force is required to push down the projection 5 disposed at a position in the vicinity of the center of the base plate 2. Furthermore, it is rather difficult to disassemble the picture frame because four frames constitute a picture frame, and a first frame must be removed by causing both ends of the first frame to slide concurrently.

It follows therefore that the known joint device is very rigid when the four frame members of a picture frame are assembled but it is not easily removed in the case of disassembly of the picture frame.

SUMMARY OF THE INVENTION

In view of the above, the present invention was made to solve the problems encountered in the case of the disassembly of a picture frame in a manner described above.

To the above and other ends, according to the present invention, in order to enhance a degree of elasticity of the base plate 2, elongated grooves 20 are cut out in parallel with engaging walls 3 and push-down members 21 are extended in parallel with the elongated grooves 20 so that the bending of the base plate 2 is facilitated and consequently the removal of the stoppers 7 is facilitated, whereby it becomes easy to remove a first frame of a picture frame.

The above and other objects, effects, features and advantages of the present invention will become more apparent from the description of a preferred embodiment thereof taken in conjunction with the accompanying drawings.

BRIEF DESCRIPTION OF THE DRAWINGS

Same reference numerals are used to designate similar parts throughout the figures.

DESCRIPTION OF THE PREFERRED EMBODIMENT

Figure 1:
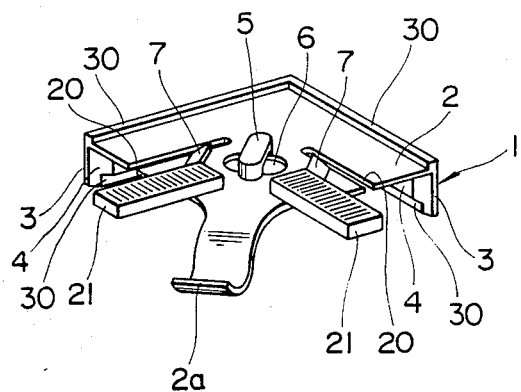
FIG. 1 is a perspective view of a preferred embodiment of a joint fixture of a joint device in accordance with the present invention.

A joint device for joining frame members of a picture frame in accordance with the present invention is illustrated in FIGS. 1-5. A joint fixture 1 is of unitary construction and is preferably made of a synthetic resin. A curved handle 2a extends from one corner of a base plate 2. As most clearly seen in FIG. 1, base plate 2 is integrally formed with handle 2a. Engaging walls 3 are formed integral with and perpendicular to the base plate 2 and to each other. The inside surfaces of the engaging walls 3 are formed with stepped portions 4 which define thickened wall portions.

A projection 5 bridges across an elongated aperture 6 formed substantially at the center of the base plate 2 so that a hanging string (not shown) can be made to pass below the projection 5 and made into engagement therewith. Stoppers 7 project from handle 2a, as shown in FIG. 1, and have a triangular cross sectional configuration and are adapted to engage with notches 12 at both ends of frame members 10a, 10b, 10c and 10d to be described below.

Figure 6:
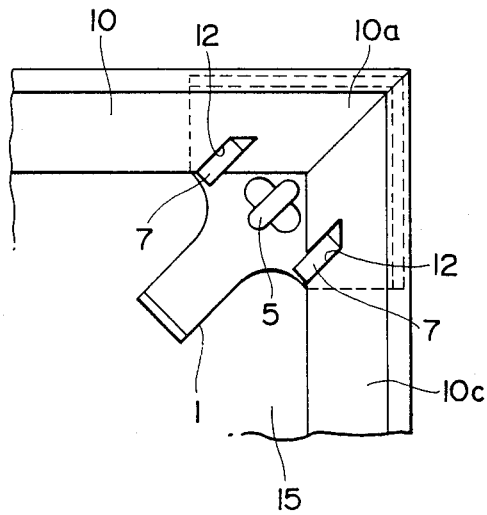
FIG. 6 is a fragmentary rear view illustrating one of the conventional frame joints.

The joint device in accordance with the present invention is different from the conventional joint device as shown in FIG. 6 in that elongated grooves 20 are formed in the base plate 2 in parallel with the engaging walls 3. Rectangular push-down grips 21 are joined to handle 2a adjacent grooves 20, as shown in FIG. 1, and extend outwardly from handle 2a with the stoppers 7 being interposed between the push-down grips 21 and the elongated grooves 20. As FIG. 1 clearly illustrates, base plate 2 is partially separated by grooves 20 from handle 2a and is integrally formed with handle 2a.

It is of course preferred that the above-mentioned component parts are in a unitary construction as a synthetic resin or metal fixture.

Figure 2:
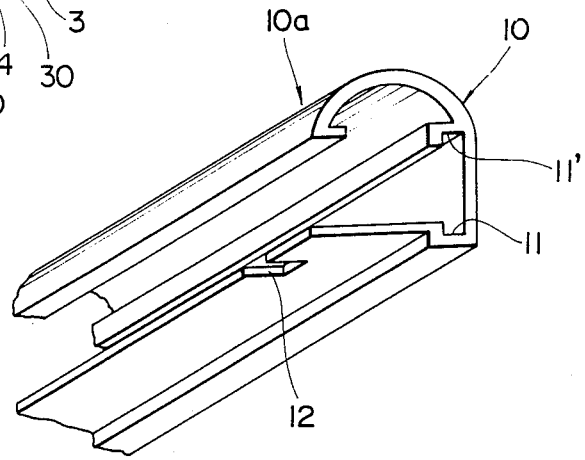
FIG. 2 is a perspective view with parts broken away and partially shown in full of a corner of a picture frame.
Figure 3:
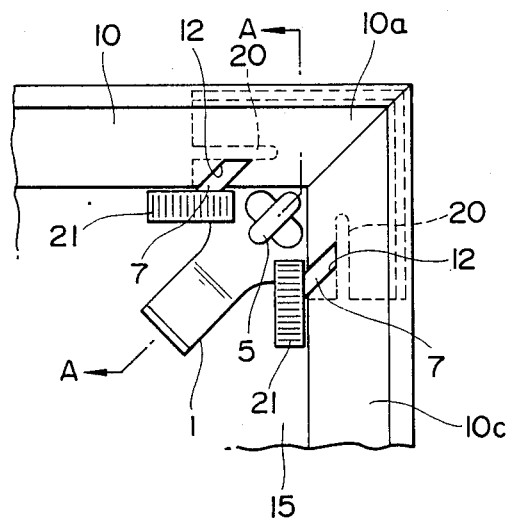
FIG. 3 is a fragmentary rear view illustrating the joint between the adjacent frame members.

Both ends of the frame members 10a, 10b, 10c and 10d which are assembled to form a picture frame 10 have a substantially U-shaped cross sectional configuration as shown in FIG. 2, and grooves 11 and 11', into which are slidably fitted outwardly extending flanges 30, which extend from opposite sides of each thickened wall portion 4 of the joint fixture 1, are formed at the bottom portion of the portion having a U-shaped cross sectional configuration. In addition, a notch 12 is cut out for engagement with the stopper 7. Thus, as FIG. 3 makes clear, stoppers 7 are received within notches 12 of adjacent frame members 10a, 10c when the frame members are joined.

Figure 4:
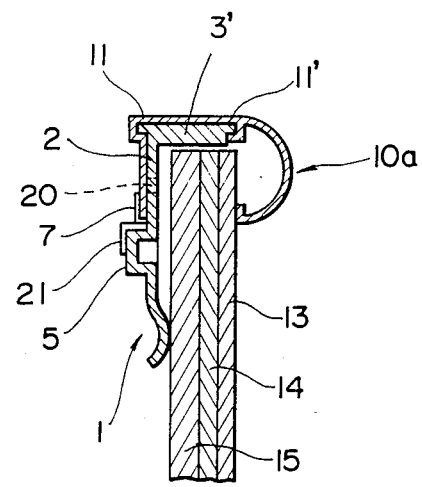
FIG. 4 is a sectional view taken along the line A—A of FIG. 3.

In FIG. 4, reference numeral 13 designates a glass sheet; 14, a picture; and 15, a back plate.

Figure 5:
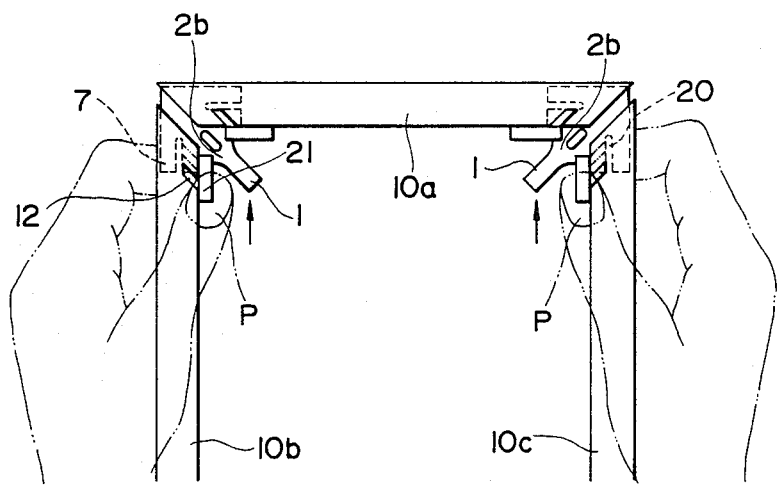
FIG. 5 is a rear view used to explain the removal of a first frame member from an assembled picture frame.

With the joint devices of the present invention with the above-mentioned construction, three frame members are joined together by the joint fixtures 1 and the last frame has joint fixtures 1 previously fitted at both ends thereof so that both ends are caused to slide simultaneously just like the conventional joint device as shown in FIG. 6. When the frame members of a picture frame are disassembled, the frame members 10b and 10c are gripped by both hands, respectively, as shown in FIG. 5 and the push-down grips 21 under the joint fixture 1 are pushed down by the thumbs P while they are simultaneously raised as indicated by the arrows. Portions 2b of handle 2a, surrounded by the grooves are easily bent and twisted so that one stopper 7 is sufficiently pushed down and manually removed, or disengaged from the notch 12 as pressure is applied to grips 21. As a result, the joint fixture 1 can be easily displaced so that the frame member 10a with the joint fixtures 1 at both ends thereof can be pulled away from the adjacent frame members 10b and 10c.

After the frame member 10a is pulled out in the manner described above, the remaining three frame members are simultaneously disengaged from each other in a manner substantially similar to that described above or sequentially at the remaining corners.

As described above, according to the present invention, unlike the conventional joint fixtures in which a considerably strong force must be applied to push down the projection 5, the base plate 2 can be easily bent and twisted due to the provision of the grooves 20 and the push-down grips 21 so that the disengagement of the frame members can be easily accomplished. Furthermore, the handle 2a becomes more elastic. Thus the present invention has an excellent feature that the picture frame 10 can be smoothly assembled or disassembled.

The essential features of the present invention has been described in this specification without restricting the present invention in minor details, materials, and proportions other than by the scope of the following claim and various changes and modifications will suggest themselves to those skilled in this art and therefore it is intended that such changes and modifications shall fall with the spirit and scope of the present invention as recited in the following claim.

What is claimed is:

1. A joint fixture of unitary construction for joining frame members of a picture frame comprising:
    a handle;
    a base plate, partially separated by substantially perpendicular elongated grooves from said handle and integrally formed with said handle;
    end engaging walls, integrally formed with and substantially perpendicular to said base plate and to each other;
    a thickened wall portion formed at an inner side of each engaging wall;
    outwardly extending flanges extending from opposite sides of each thickened wall portion;
    stoppers, each having a triangular cross sectional configuration, projecting from said handle, said elongated grooves being cut through said base plate substantially parallel to said engaging walls; and
    elongated push-down grips joined to said handle adjacent said elongated grooves and extending from said handle, said stoppers interposed between said push-down grips and said elongated grooves, said outwardly extending flanges engaging grooves defined inside the frame members, said stoppers being received in notches formed at ends of adjacent frame members when said frame members are joined, said stoppers being manually removable from said notches by pressure applied to said push-down grips to permit separation of said frame members from one another.

* * * * *